US011739649B2

(12) United States Patent
Marchal et al.

(10) Patent No.: US 11,739,649 B2
(45) Date of Patent: Aug. 29, 2023

(54) WOVEN FIBROUS PREFORM FOR MANUFACTURING A FAN BLADE MADE OF COMPOSITE MATERIAL

(71) Applicant: SAFRAN, Paris (FR)

(72) Inventors: Yann Didier Simon Marchal, Moissy-Cramayel (FR); Dominique Marie Christian Coupe, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/772,682

(22) PCT Filed: Oct. 23, 2020

(86) PCT No.: PCT/FR2020/051925
§ 371 (c)(1),
(2) Date: Apr. 28, 2022

(87) PCT Pub. No.: WO2021/084194
PCT Pub. Date: May 6, 2021

(65) Prior Publication Data
US 2022/0403748 A1 Dec. 22, 2022

(30) Foreign Application Priority Data

Oct. 29, 2019 (FR) ...................................... 1912137

(51) Int. Cl.
*F01D 5/28* (2006.01)
*B29C 70/24* (2006.01)
(Continued)

(52) U.S. Cl.
CPC .............. *F01D 5/282* (2013.01); *B29C 70/24* (2013.01); *B29K 2105/089* (2013.01);
(Continued)

(58) Field of Classification Search
CPC .......... F01D 5/282; F01D 5/284; B29C 70/24
See application file for complete search history.

(56) References Cited

U.S. PATENT DOCUMENTS 8,153,539 B2 * 4/2012 Coupe ..................... B29C 70/24
442/205
8,505,588 B2 * 8/2013 Coupe .................. D03D 25/005
139/11
(Continued)

FOREIGN PATENT DOCUMENTS

DE 10 2011 084472 B3 1/2013
WO WO 2019/097147 A1 5/2019

OTHER PUBLICATIONS

International Search Report as issued in International Patent Application No. PCT/FR2020/051925, dated Feb. 12, 2021.
(Continued)

*Primary Examiner* — Michael L Sehn
(74) *Attorney, Agent, or Firm* — Pillsbury Winthrop Shaw Pittman LLP (57) ABSTRACT

A three-dimensional fibrous preform of a fan blade includes a blade root and a blade airfoil between the blade root and a free end of the preform. The airfoil has an area with two skins and a longitudinal stiffener between the skins and, in a transverse plane, transverse yarns of the skins woven in pairs in the first and in the second skin either side of the stiffener, the yarns of a first pair of the first skin are separated into two unit yarns at the stiffener, the unit yarns being woven separately with longitudinal yarns, the yarns of a second pair of the second skin are separated into two unit yarns at the stiffener, the yarns being woven separately with longitudinal yarns, and a yarn of each pair cross over each other twice in the stiffener.

9 Claims, 5 Drawing Sheets

(51) Int. Cl.
    *B29K 105/08*    (2006.01)
    *B29K 105/10*    (2006.01)
    *B29L 31/08*     (2006.01)

(52) U.S. Cl.
    CPC ............... *B29K 2105/0845* (2013.01); *B29K 2105/0881* (2013.01); *B29K 2105/107* (2013.01); *B29L 2031/082* (2013.01); *F05D 2220/323* (2013.01); *F05D 2300/6012* (2013.01); *F05D 2300/6034* (2013.01); *F05D 2300/614* (2013.01)

(56) References Cited

U.S. PATENT DOCUMENTS

2013/0216770 A1* 8/2013 Gilbertson ........... D03D 25/005
                                                    139/408
2016/0245103 A1* 8/2016 Gimat .................. F01D 25/005

OTHER PUBLICATIONS

Notice of Allowance as issued in U.S. Appl. No. 17/770,537, dated May 2, 2023.

\* cited by examiner

WOVEN FIBROUS PREFORM FOR MANUFACTURING A FAN BLADE MADE OF COMPOSITE MATERIAL

CROSS-REFERENCE TO RELATED APPLICATIONS

This application is the U.S. National Stage of PCT/FR2020/051925, filed Oct. 23, 2020, which in turn claims priority to French patent application number 1912137 filed Oct. 29, 2019. The content of these applications are incorporated herein by reference in their entireties.

TECHNICAL FIELD

The present invention relates to the general field of composite material parts. More specifically, the invention relates to a fibrous preform for manufacturing a fan blade for aircraft turbine engine.

PRIOR ART

In the field of aircraft turbine engines, the weight savings of parts is a major issue both regarding the manufacturing costs of these parts and the environmental and energy efficiency of turbine engines. This issue rapidly led to the development of parts in composite materials to replace traditional metal parts in different sections of the turbine engine.

In manner known per se, a part in composite material can be obtained by preparing a fibrous preform and densifying the preform with a matrix. Depending on the envisaged application, the preform can be in glass fibres, carbon or ceramic, and the matrix can be in an organic material (polymer), in carbon or ceramic.

For parts of relatively complex shape, it is known to produce a fibrous structure or blank in a single piece by three-dimensional (3D) or multilayer weaving and to give form to the fibrous structure to obtain a fibrous preform having a shape close to that of the part to be manufactured.

The fan of an aircraft turbine engine comprises blades mounted on a rotating disk. The fan blades which are of large dimension to produce most of the thrust of the turbine engine, can be exposed to foreign object impacts of various types (birds, gravel, ice blocks, sand, etc.) and additionally may undergo damaging mechanical stresses related to centrifugal force.

There still exists a need for a fan blade having improved mechanical strength whilst remaining of reduced weight.

SUMMARY OF THE INVENTION

For this purpose, the invention proposes a fibrous preform intended to form the fibrous reinforcement of a fan blade of an aircraft turbine engine, in composite material with fibrous reinforcement densified by a matrix, the fibrous preform being in a single piece and being obtained by three-dimensional weaving of a plurality of longitudinal yarns or strands extending in a direction corresponding to the longitudinal direction of the blade, with a plurality of transverse yarns or strands, the preform comprising a blade root part and a blade airfoil part extending between the blade root part and a free end of the fibrous preform, characterized in that the airfoil part has a first area comprising a first skin corresponding to a lower surface of the blade, a second skin corresponding to an upper surface of the blade, and a longitudinal stiffener portion extending between the first skin and the second skin, and in that in a transverse plane of the first area:

transverse yarns or strands of the first skin and of the second skin are woven in pairs in the first skin and in the second skin either side of the longitudinal stiffener portion;

the yarns or strands of at least one first pair of transverse yarns or strands of the first skin are separated into two unit yarns or strands at the longitudinal stiffener portion, said unit yarns or strands being woven separately with longitudinal yarns or strands in said portion;

the yarns or strands of at least one second pair of transverse yarns or strands of the second skin are separated into two unit yarns or strands at the longitudinal stiffener portion, said unit yarns or strands being woven separately with longitudinal yarns or strands in said portion; and at least one yarn or strand of the first pair and at least one yarn or strand of the second pair cross over each other at least twice in the longitudinal stiffener portion.

The first area of the fibrous preform therefore defines two spaces between the two skins which are positioned either side of the longitudinal stiffener portion and separated by the latter. In the fan blade which is to integrate this preform as reinforcement, these two spaces in the fibrous preform allow the forming of two cavities or recesses which generally extend in the longitudinal direction.

By "three-dimensional weaving", "3D weaving", "multilayer weaving" it is meant herein a weaving mode whereby at least some of the warp yarns (or longitudinal yarns) bind weft yarns (or transverse yarns) over several weft layers. Said weaving can be performed on a weaving loom of Jacquard type in manner known per se.

The fibrous preform of the invention has the advantage that it can be obtained in a single weaving step, and has a first area comprising a longitudinal stiffener portion which, when the preform forms the fibrous reinforcement of a fan blade in composite material, will act as stiffening element along the longitudinal direction to improve the mechanical strength of part of the blade, in particular in the event of impacts, whilst reducing the weight thereof. The first area of the fibrous preform defines two spaces which will form cavities or recesses in the blade making it more lightweight compared with a solid blade.

The longitudinal stiffener portion is formed from pairs of transverse yarns or strands which are split (separated) into unit yarns or strands which are then woven separately with longitudinal yarns or strands inserted at the longitudinal stiffener portion. With this weaving mode from separated pairs, the longitudinal stiffener portion is therefore bound to the skins via weaving, ensuring good strength of the assembly. In addition, it is not necessary to insert additional transverse yarns or strands to obtain the longitudinal stiffener portion, which simplifies weaving of the preform. Crossover of the longitudinal yarns or strands from the first and the second skin ensures binding of the skins via weaving with the longitudinal stiffener portion, whilst increasing the mechanical strength of the assembly.

In one example of embodiment, the first area can extend in the longitudinal direction over a length less than or equal to 75% of the height of the preform, measured in the longitudinal direction. This length range provides a good trade-off between good mechanical strength of the blade and weight savings.

In one example of embodiment, the first area can extend into a portion of the airfoil part located at between 50% of the height of the preform measured in the longitudinal direction and the free end of the fibrous preform. This arrangement allows the first area to be positioned in the upper half of the preform, where the blade is most subjected to centrifugal forces and foreign object impacts.

In one example of embodiment, at least some of the longitudinal yarns or strands contained in the longitudinal stiffener portion can have a higher yarn count than the yarn count of the longitudinal yarns or strands contained in the first and the second skin. This characteristic allows an increase in the stiffness of the stiffener element which will be formed from the stiffener portion when the preform is densified to form a part in composite material. For example, the yarn count of the longitudinal yarns or strands in the skins can be less than or equal to 24 k, and the yarn count of the longitudinal yarns or strands in the stiffener portion can be 48 k.

In one example of embodiment, the longitudinal yarns or strands can be warp yarns or strands, and the transverse yarns or strands are weft yarns or strands.

In one example of embodiment, a filler material can be present between the first skin and the second skin in the first area. The filler material can be foam. The filler material is located in the two spaces defined in the first area, and is therefore present in the cavities or recesses of the blade. This filler material enables the preform to maintain its shape despite the presence of the first area, without unduly increasing the weight thereof.

In one embodiment, the airfoil part can have a second area in the vicinity of the free end of the preform, comprising a plurality of layers of unidirectional fabrics of transverse yarns or strands. This second area can extend in the longitudinal direction over a length less than or equal to 25% of the height of the preform measured in the longitudinal direction. This second area can extend into a portion of the airfoil part located at between 80% of the height of the preform, measured in the longitudinal direction, and the free end of the fibrous preform. This second area has greater stiffness than the remainder of the preform in the transverse direction, which improves the mechanical strength of the blade in the vicinity of its free end which is more sensitive to foreign object impacts.

A further subject of the invention is a fan blade for aircraft turbine engine, in composite material with fibrous reinforcement, densified with a matrix comprising a fibrous preform such as described in the foregoing as fibrous reinforcement, the blade having a portion corresponding to the first area of the fibrous preform, said portion comprising two cavities separated by a longitudinal stiffener element corresponding to the stiffener portion of the platform. A filler material can be placed in said cavities.

A final subject of the invention is a fan module of aircraft turbine engine, comprising a fan disk and a plurality of fan blades such as described above mounted on the fan disk.

BRIEF DESCRIPTION OF THE DRAWINGS

Other characteristics and advantages of the present invention will become apparent from the description given below with reference to the appended drawings illustrating examples of embodiment thereof that are in no way limiting. In the Figures.

DESCRIPTION OF EMBODIMENTS

Figure 1:
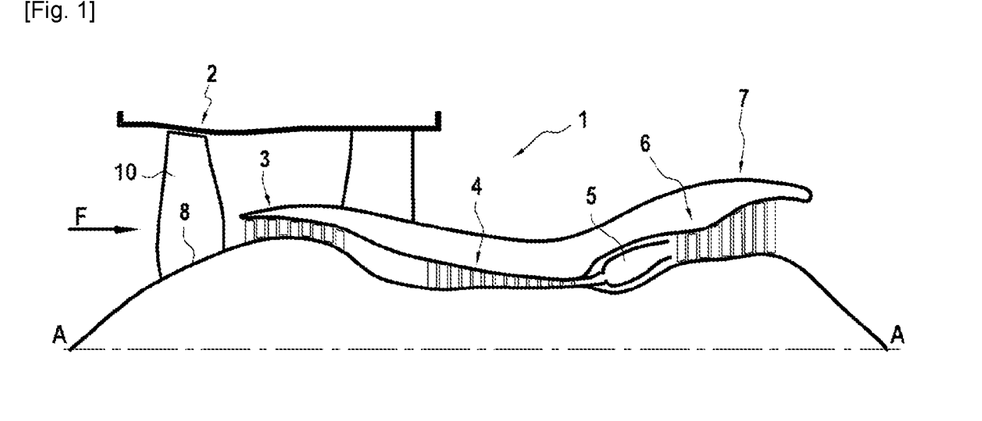
FIG. 1 is a very schematic longitudinal, cross-sectional view of an aircraft turbine engine.

FIG. 1 gives a schematic view in longitudinal cross-section of an aircraft turbine engine 1, here a turbo-fan jet engine centred on axis A-A. From upstream to downstream in direction F of the gas flow in the turbine engine, it comprises: a fan 2, a low-pressure compressor 3, high-pressure compressor 4, a combustion chamber 5, a high-pressure turbine 6 and low-pressure turbine 7.

Figure 2:
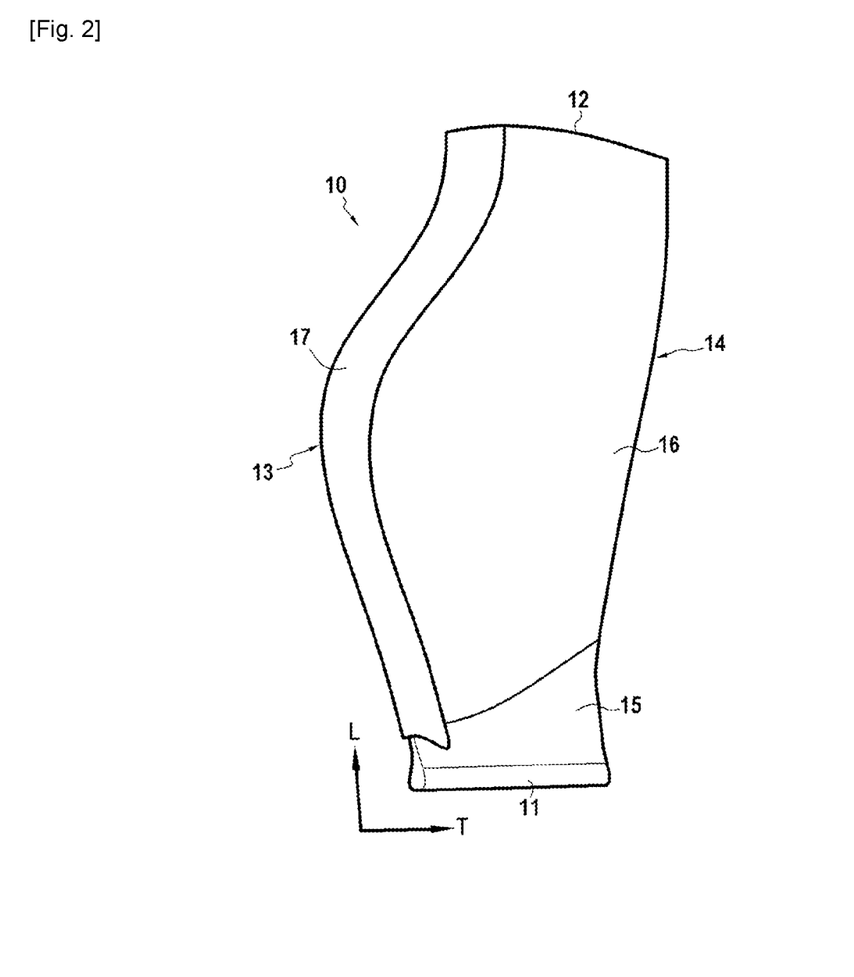
FIG. 2 schematically illustrates a fan blade in composite material of an aircraft turbine engine.

The fan 2 particularly comprises a rotating disk 8 on which there is mounted a plurality of fan blades 10 of which one is illustrated in FIG. 2.

The fan blade 10 extends in a longitudinal direction L between a root 11 and a free end 12, and in transverse direction T between a leading edge 13 and trailing edge 14. Between the root 11 and tip 12, the blade comprises a support 15 and an airfoil body 16 positioned between the support 15 and tip 12. The fan blade 10 is in composite material comprising a fibrous reinforcement densified by a matrix.

In the illustrated example, the blade 10 has a metal leading edge 17, for example in the form of a metal foil. Said metal leading edge 17 can be secured after obtaining the blade 10 or it can be integrated in the blade 10 during the manufacturing process in manner known per se.

Figure 3:
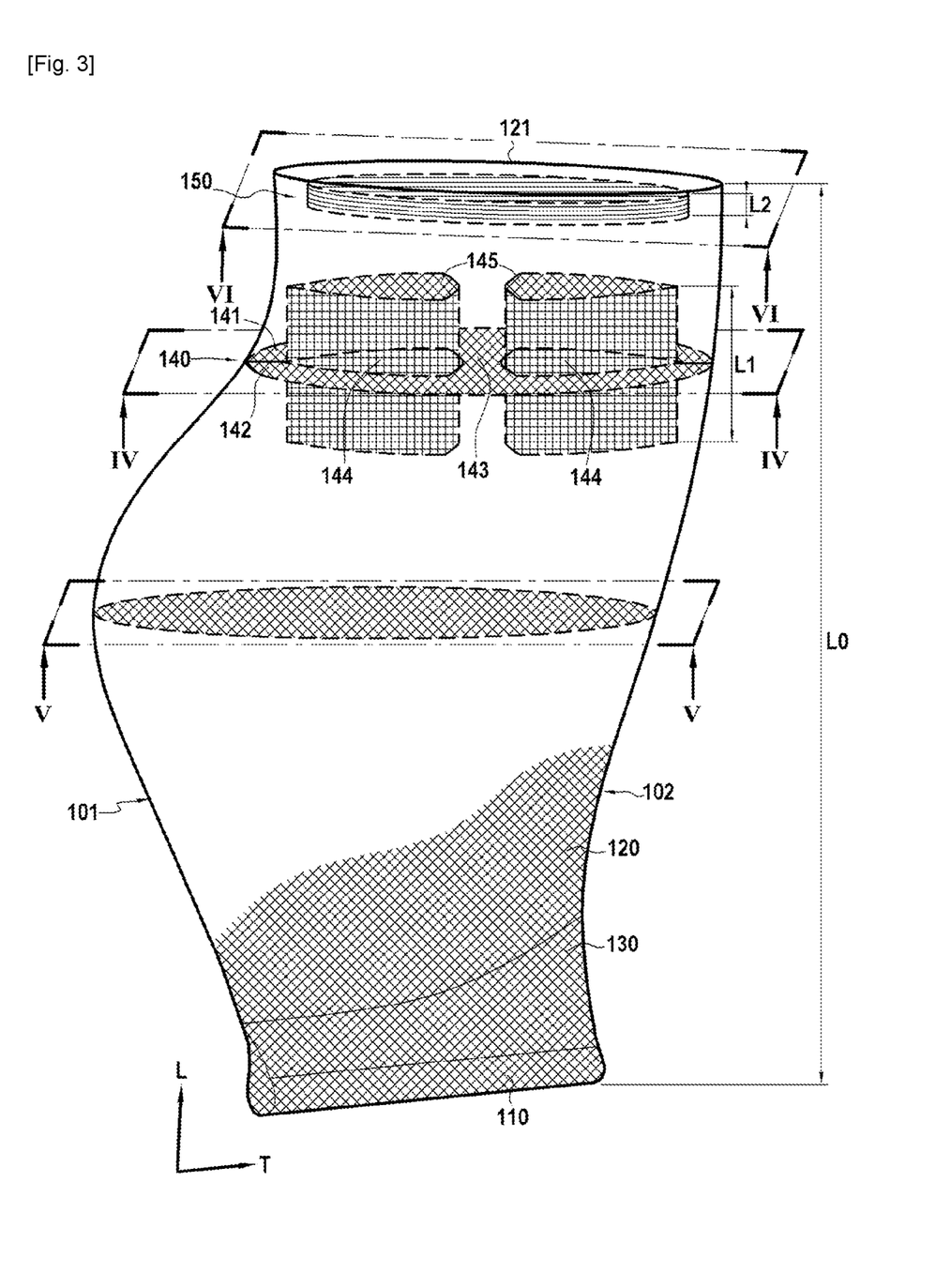
FIG. 3 is a schematic view of a fibrous preform for fan blade according to one embodiment of the invention.

FIG. 3 gives a schematic view of an example of a fibrous preform 100 intended to form the fibrous reinforcement of the blade 10. This fibrous preform 100 can be obtained for example by three-dimensional weaving of a fibrous blank on a weaving loom of Jacquard-type, and cutting the excess yarns of the woven fibrous blank.

The fibrous preform 100 can generally have a three-dimensional weave and it may mostly comprise an interlock or multilayer weave for example. By "interlock weave", it is to be understood a three-dimensional weave in which each layer of warp yarns binds several layers of weft yarns, with all the yarns of the same warp column having the same movement in the plane of the weave. Document WO2006/136755 describes the obtaining of said weaves. As described below, this fibrous preform can be densified to obtain a fan blade 10 such as the one illustrated in FIG. 2.

The fibrous preform 100 extends in a longitudinal direction L between a blade root part 110 and blade airfoil part 120. The preform 100 has a free end 121 positioned at the end of the blade airfoil part 120 opposite the root part 110. A blade support part 130 is contained between the blade root part 110 and blade airfoil part 120. In general, the blade root part 110 is thicker than the blade support part 130, and the thickness of the blade airfoil part 120 is variable. The fibrous preform 100 extends in a transverse direction T between a first edge 101 intended to form the leading edge of the blade and a second edge 102 intended to form the trailing edge of the blade.

In the illustrated example, the longitudinal direction L also corresponds to the general direction in which the warp yarns or strands extend in the fibrous preform 100, whereas the transverse direction T corresponds to the general direction in which the weft yarns or strands extend. It will be noted that throughout this text warp and weft can be reversed.

According to the invention, the airfoil part 120 of the preform 100 comprises a first area 140 having a particular weave. The first area 140 here extends over only part of the airfoil part 120, and forms an intermediate portion of the airfoil part 120. In this first area 104, the preform 100 comprises a first skin 141 corresponding to a lower surface of the blade 10 and a second skin 142 corresponding to an upper surface of the blade 10 which are linked together via a longitudinal stiffener portion 143. The longitudinal stiffener portion 143 is in the form of a beam extending in the longitudinal direction L. In this first area 140, the ends of the skins 141 and 142 are joined at the edges 101 and 102 so that the preform 100 has two cavities 144 or recesses separated by the longitudinal stiffener portion 143. A filler material 145 such as foam can be inserted in the cavities 144 to enable the preform 100 to maintain its shape during the densifying process described below, whilst remaining of reduced weight. Either side of the first area 140 in the longitudinal direction, the preform 100 generally has a conventional three-dimensional weave.

The first area 140 can extend in the longitudinal direction L over a length L1 less than or equal to 75% of the height L0 of the preform measured in the longitudinal direction L. In addition, the first area 140 is preferably located in a portion of the airfoil part 120 located at between 50% of the height L0 of the preform measured in the longitudinal direction and the free end 121 of the fibrous preform.

Figure 4:
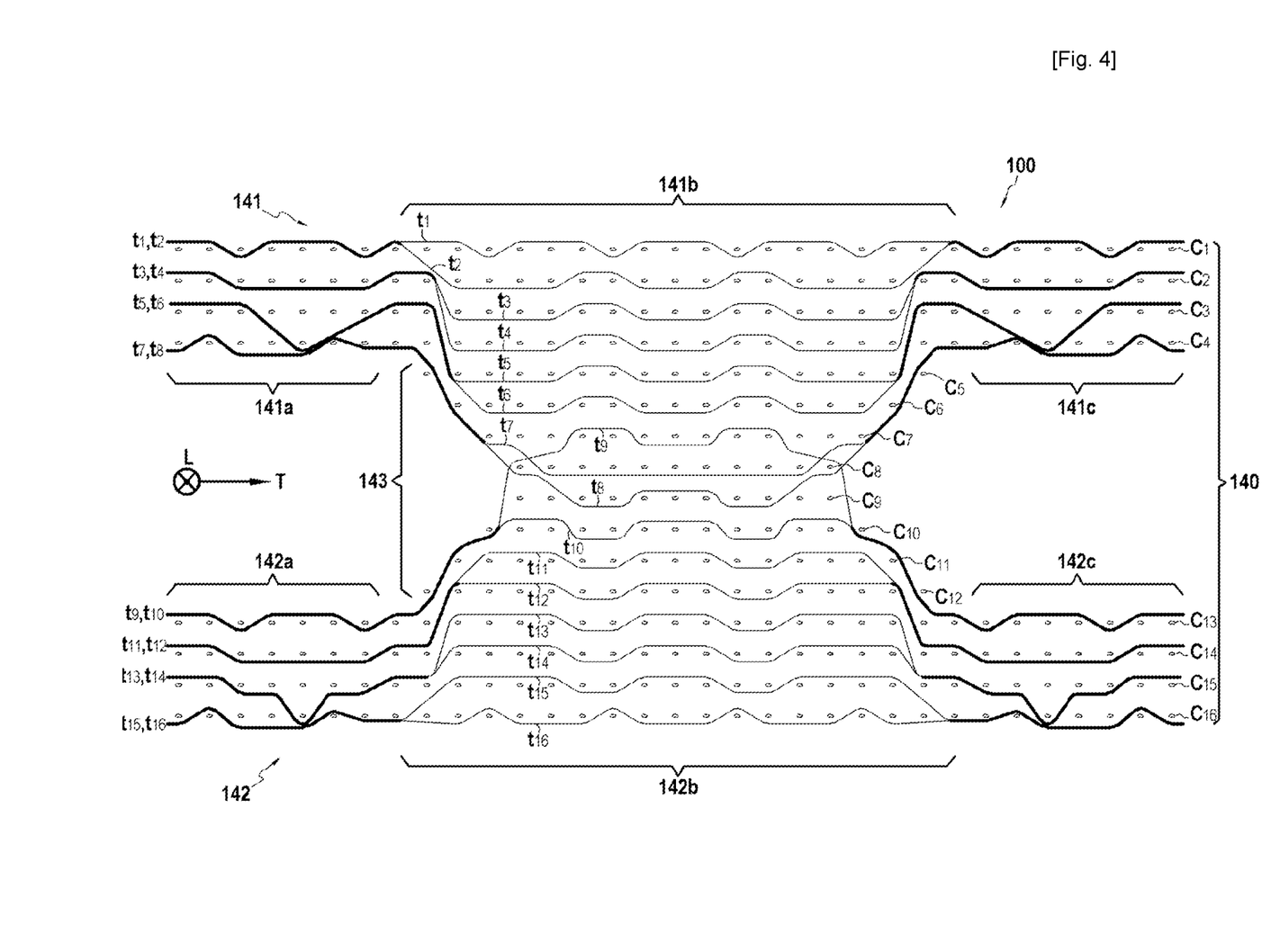
FIG. 4 gives a schematic example of the weave in the transverse plane IV of the fibrous preform in FIG. 3.

FIG. 4 schematically illustrates a weave in a transverse plane of the preform 100 at plane IV in FIG. 3. This weave is reproduced on the entire first area 140 of the preform 100.

Figure 5:
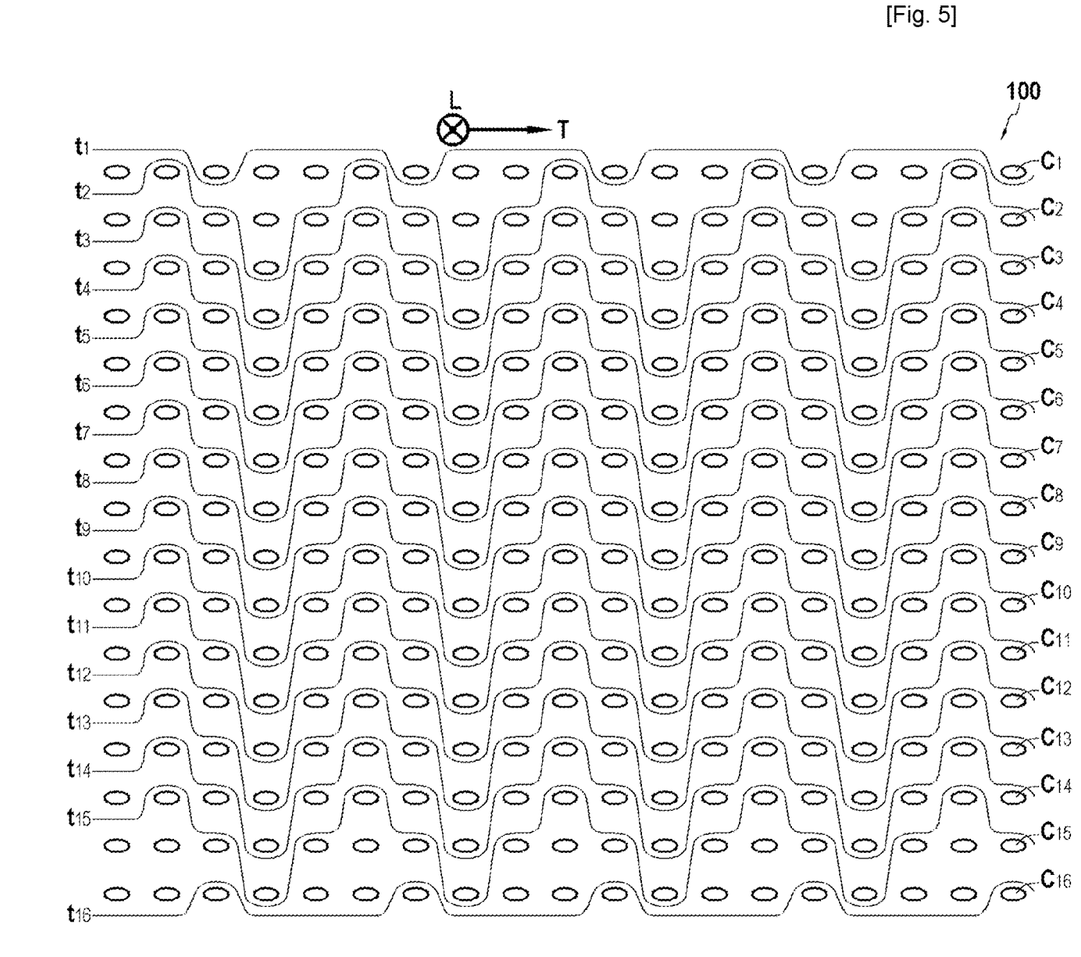
FIG. 5 gives a schematic example of the weave in the transverse plane V of the fibrous preform in FIG. 3.

FIG. 5 illustrates layers $c_1$-$c_{16}$ of warp (longitudinal) yarns or strands and the pathways $t_1$-$t_{16}$ of the weft (transverse) yarns or strands. For reasons of simplification, the terms warp yarns and weft yarns will be used in the remainder of the description.

The first skin 141 comprises four layers $c_1$-$c_4$ of warp yarns bound by weft yarns $t_1$-$t_8$. The second skin 142 similarly comprises four layers $c_{13}$-$c_{16}$ of warp yarns bound by weft yarns $t_9$-$t_{16}$. The stiffener portion 143 comprises eight layers $c_5$-$c_{12}$ of warp yarns. It will be noted that in the first skin 141 and the second skin 142 there are twice more weft yarns than layers of warp yarns, since the weft yarns are woven in pairs in some parts of the skins 141 and 142.

The first skin 141 can be divided into three parts 141a, 141b and 141c along the transverse direction T. The first part 141a and the third part 141c form free parts of the first skin 141 and are positioned either side of the stiffener portion 143. In the first 141a and third 141c parts, the weft yarns are woven in pairs. Therefore, for example, the weft yarns $t_1$ and $t_2$ are woven together in part 141a and in part 141c i.e. they follow the same pathway. In particular in parts 141a and 141c, weaving can be of interlock-type. It will be noted that on the surface of the first skin 141 opposite the stiffener portion 143, and in parts 141a and 141c, weaving of the weft yarns $t_1$ and $t_2$ is two-dimensional to impart a smooth surface condition to the part in composite material.

Similarly, the second skin 142 can be divided into three parts 142a, 142b and 142c along the transverse direction T. The first part 142a and third part 142c form free parts of the second skin 142 and are positioned either side of the stiffener portion 143. In the first 142a and third 142c parts, the weft yarns are woven in pairs. Therefore, for example, the weft yarns $t_{15}$ and $t_{16}$ are woven together in part 142a and part 142c, i.e. they follow the same pathway. In particular, in parts 142a and 142c weaving can be of interlock type. It will be noted that the surface of the second skin 142 opposite the stiffener portion 143, and in parts 142a and 142c, weaving of the weft yarns $t_{15}$ and $t_{16}$ is two-dimensional to impart a smooth surface condition to the part in composite material.

In the illustrated example, the weft yarns of each pair of weft yarns $t_1$-$t_2$, $t_3$-$t_4$, $t_5$-$t_6$ and $t_7$-$t_8$ are separated into two unit yarns at the stiffener portion 143, and generally either side thereof. Once separated, the unit yarns are woven separately with warp yarns in part 141b and in the stiffener portion 143. By "woven separately" it is meant that the yarns do not follow the same pathway. Separation of the pairs (or splitting of the pairs) therefore allows doubling of the number of weft yarns available at the longitudinal stiffener portion so that this portion can be woven with additional layers of warp yarns. Therefore, the weft yarns $t_1$ to $t_4$ are respectively woven with layers $c_1$ to $c_4$ of warp yarns in part 141b of the first skin 141, whilst the weft yarns $t_5$ to $t_8$ are respectively woven with layers $c_5$, $c_6$, $c_8$ and $c_9$ of warp yarns in the stiffener portion 143. Some of the unit weft yarns of the first skin 141 are woven with layers of warp yarns of the first skin 141, and other unit weft yarns of the first skin 141 are woven with layers of warp yarns in the stiffener portion 143.

In the illustrated example, the weft yarns of each pair of weft yarns $t_9$-$t_{10}$, $t_{11}$-$t_{12}$, $t_{13}$-$t_{14}$ and $t_{15}$-$t_{16}$ are separated into two unit yarns at the stiffener portion 143 and generally either side thereof. Once separated, the unit yarns are woven separately with warp yarns in part 142b and in the stiffener portion 143. Therefore, the weft yarns $t_{13}$ to $t_{16}$ are woven respectively with the layers $c_{13}$ to $c_{16}$ of warp yarns in part 142b of the second skin 142, whilst the weft yarns $t_9$ to $t_{12}$ are respectively woven with layers $c_7$, $c_{10}$ to $c_{12}$ of warp yarns in the stiffener portion 143. Some of the unit weft yarns of the second skin 142 are woven with layers of warp yarns of the second skin 142, and other unit weft yarns of the second skin 142 are woven with layers of warp yarns in the stiffener portion 143.

In the illustrated example, the unit weft yarns obtained by splitting pairs of weft yarns are each woven with a single layer of warp yarns that is different in parts 141b and 142b and in the stiffener portion 143.

In the illustrated example, the unit weft yarns $t_7$ and $t_8$ arriving from the first skin 141 cross over the weft yarn $t_9$ arriving from the second skin 142 in the stiffener portion 143. This crossover here allows layers $c_7$, $c_8$ and $c_9$ of warp yarns to be bound to the first skin 141 via weft yarns $t_7$ and $t_8$, and to the second skin 142 via weft yarn $t_9$. Evidently other weaves can be envisaged whilst maintaining at least two crossovers of weft yarns arriving from the first skin 141 and the second skin 142 in the stiffener portion 143, to ensure cohesion of the preform 100. Therefore, in this example, only some of the unit weft yarns arriving from the first skin 141 cross over only some of the unit weft yarns arriving from the second skin 142; the other unit weft yarns being woven with different warp yarn layers without crossing over each other.

In the illustrated example, there are four warp yarns per column in the first skin 141 and in the second skin 142 i.e. eight yarns per column at the free parts 141a, 142a, 141c, 142c of the skins. The number of warp yarns in one same warp column is gradually increased here to reach sixteen warp yarns per column in the preform at the stiffener portion 143. In this example, the weft yarns of the weft yarn pairs are separated at different warp columns, i.e. at different points along the transverse direction T, this allowing gradual insertion of the new warp yarns and facilitated weaving.

It can be advantageous that the yarn count (i.e. average number of filaments in a yarn) of the warp yarns of layers $c_5$ to $c_{12}$ in the stiffener portion 143 is higher than the yarn count of the warp yarns of layers $c_1$ to $c_4$ and $c_{13}$ to $c_{16}$ in skins 141 and 142, to increase the stiffening function of the stiffener portion 143 in a part in composite material.

Either side of the first skin 141 in the longitudinal direction, the weave is schematically illustrated in FIG. 5 (and corresponds for example to transverse plane V in FIG. 3). This weave is of conventional interlock type where each weft yarn is woven with warp yarns of three different layers. The preform 100 also still has two-dimensional weaving on the surface i.e. on the surfaces of the preform 100 corresponding to the lower and upper surfaces of the fan 10. The weft yarns $t_1$-$t_{16}$ here are woven separately with the warp yarns of layers $c_1$-$c_{16}$.

The preform 100 may also comprise a second area 150 positioned in the vicinity of the free end 121 of the preform 100 in the airfoil part 120, which allows the strength of the blade 10 to be increased in the event of foreign object impact. The second area 150 has a plurality of layers of unidirectional fabrics of weft yarns. More specifically, FIG. 6 very schematically illustrates a weave at the transverse plane VI (FIG. 3) of the second area 150. It can be seen that in a part 151 located in the core of the preform 100, the weft yarns $t_4$ to $t_{13}$ are not woven with warp yarns (taken out of the preform 100 either side of the second area 150) and all extend parallel in the transverse direction T, forming a layer of unidirectional fabric. The stiffness of the preform in the transverse direction is thereby increased in this second area 150.

Figure 6:
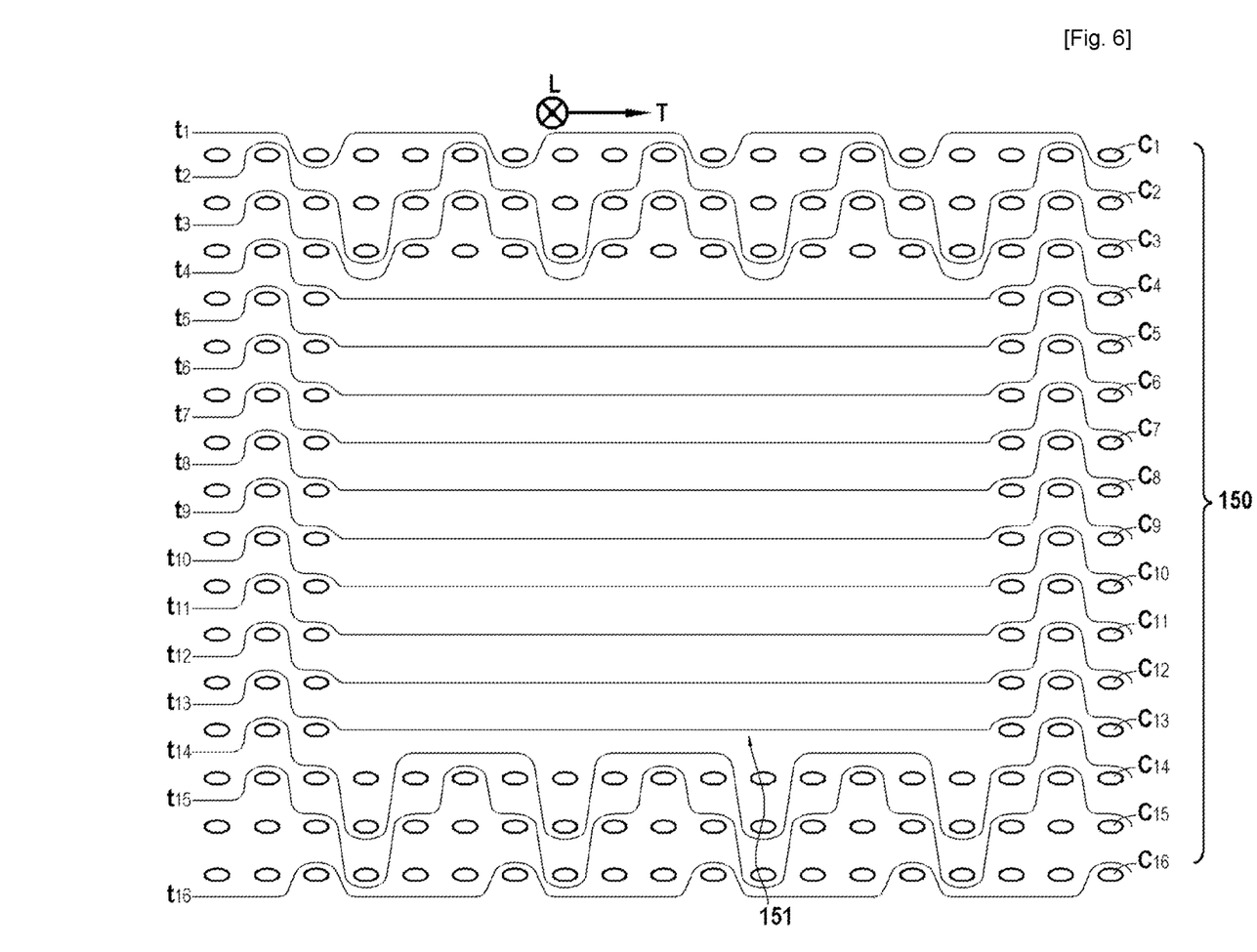
FIG. 6 gives a schematic example of the weave in the transverse plane VI of the fibrous preform in FIG. 3.

The second area 150 can extend in longitudinal direction L over a length L2 less than or equal to 25% of the height L0 of the preform 100 measured in the longitudinal direction L. This second area can extend into a portion of the airfoil part 120 located at between 80% of the height L0 of the preform measured in the longitudinal direction L and the free end 121 of the fibrous preform.

The preform 100 can be woven from the root 110 towards the free end 121. Once the first area 140 has been woven, and before closing the cavities 144 with conventional three-dimensional weaving, the filler material 145 can be inserted in the cavities 144, the cavities 144 then being closed and weaving continued as far as the free end 121 of the preform 100. As a variant, it is possible to leave the cavities 144 accessible after weaving all the preform 100 by keeping two unbound portions after the first area 140 and inserting the filler material 145 in the cavities 144 by opening the preform 100 at the free end 121.

In general, the fibres of the fibrous preform 100 are in a material selected as a function of the envisaged application e.g. in glass, carbon or ceramic.

Densification of the fibrous preform with a matrix to obtain a part in composite material is performed by holding the preform in a shaping tool at least until rigidification (or consolidation) of the preform.

The type of matrix is chosen as a function of the envisaged application, e.g. an organic matrix obtained in particular from a polymer matrix precursor resin such as an epoxy, bismaleimide or polyimide resin, or a carbon matrix or ceramic matrix.

For an organic matrix, the fibrous preform is impregnated with a composition containing the matrix precursor resin before being placed in the shaping tool, or after shaping, impregnation in this latter case being performed by resin infusion or with a method of RTM type (Resin Transfer Moulding) in an adapted mould. For a matrix in carbon or ceramic, densification can be obtained by CVI (Chemical Vapour Infiltration) or by impregnation with a liquid composition containing a carbon or ceramic precursor resin with pyrolytic heat treatment or ceramization of the precursor, these methods being widely known per se.

The invention claimed is:

1. A fibrous preform intended to form a fibrous reinforcement of a fan blade of an aircraft turbine engine, in composite material with the fibrous reinforcement densified with a matrix, the fibrous preform being in a single piece and being obtained by three-dimensional weaving of a plurality of longitudinal yarns or strands, extending in a direction corresponding to the longitudinal direction of the blade, with a plurality of transverse yarns or strands, the preform comprising a blade root part and a blade airfoil part extending between the blade root part and a free end of the fibrous preform, wherein the airfoil part of the preform has a first area comprising a first skin corresponding to a lower surface of the blade, a second skin corresponding to an upper surface of the blade, and a longitudinal stiffener portion extending between the first skin and the second skin, and in that, in a transverse plane of the first area;

transverse yarns or strands of the first skin and of the second skin are woven in pairs in the first skin and in the second skin on either side of the longitudinal stiffener portion;

the yarns or strands of at least one first pair of transverse yarns or strands of the first skin are separated into two unit yarns or strands at the longitudinal stiffener portion, said unit yarns or strands being woven separately with longitudinal yarns or strands in said portion;

the yarns or strands of at least one second pair of transverse yarns or strands of the second skin are separated into two unit yarns or strands at the longitudinal stiffener portion, said unit yarns or strands being woven separately with longitudinal yarns or strands in said portion; and at least one yarn or strand of the first pair and at least one yarn or strand of the second pair cross over each other at least twice in the longitudinal stiffener portion.

2. The fibrous preform according to claim 1, wherein the first area extends in the longitudinal direction over a length less than or equal to 75% of the height of the preform measured in the longitudinal direction.

3. The fibrous preform according to claim 1, wherein the first area extends into a portion of the airfoil part located at between 50% of the height of the preform measured in the longitudinal direction and the free end of the preform.

4. The fibrous preform according to claim 1, wherein at least some of the longitudinal yarns or strands contained in the longitudinal stiffener portion have a higher yarn count than the yarn count of the longitudinal yarns or strands contained in the first and the second skin.

5. The fibrous preform according to claim 1, wherein the longitudinal yarns or strands are warp yarns or strands and the transverse yarns or strands ($t1$-$t16$) are weft yarns or strands.

6. The fibrous preform according to claim 1, wherein a filler material is present between the first skin and the second skin in the first area.

7. The fibrous preform according to claim 1, wherein the airfoil part has a second area in the vicinity of the free end of the preform comprising a plurality of layers of unidirectional fabrics of the transverse yarns or strands.

8. A fan blade of an aircraft turbine engine, in composite material with fibrous reinforcement densified with a matrix comprising a fibrous preform according to claim 1 as the fibrous reinforcement, the blade having a portion corresponding to the first area of the fibrous preform, said portion comprising two cavities separated by the longitudinal stiffener element corresponding to the longitudinal stiffener portion of the preform.

9. A fan module of the aircraft turbine engine, comprising a fan disk and a plurality of the fan blades according to claim 8 mounted on the fan disk.

* * * * *